US008925822B2

(12) United States Patent
Scott et al.

(10) Patent No.: US 8,925,822 B2
(45) Date of Patent: Jan. 6, 2015

(54) ENCODING, UPDATING, AND DECODING BARCODES IN A DOCUMENT

(75) Inventors: Matthew R. Scott, Beijing (CN); Jonathan Tien, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1131 days.

(21) Appl. No.: 12/236,509

(22) Filed: Sep. 24, 2008

(65) Prior Publication Data

US 2010/0072269 A1    Mar. 25, 2010

(51) Int. Cl.
*G02B 26/10*     (2006.01)
*G06F 17/30*     (2006.01)

(52) U.S. Cl.
CPC .... *G06F 17/30011* (2013.01); *G06F 17/30725* (2013.01)
USPC ............ 235/462.25; 235/462.01; 235/462.08; 235/462.09; 382/190; 382/306

(58) Field of Classification Search
USPC ............. 235/462.01, 462.08, 462.09, 462.25; 382/190, 306
See application file for complete search history.

(56) References Cited

U.S. PATENT DOCUMENTS

| 6,002,491 | A  | 12/1999 | Li et al. |
| 7,028,902 | B2 | 4/2006  | Xu et al. |
| 7,028,911 | B2 | 4/2006  | Cheung et al. |
| 7,150,399 | B2 | 12/2006 | Barrus et al. |
| 7,328,847 | B1 | 2/2008  | Shen et al. |
| 7,349,577 | B2 | 3/2008  | Kaneda et al. |
| 2002/0191219 | A1* | 12/2002 | Bondy et al. ................. 358/1.18 |
| 2004/0044958 | A1  | 3/2004  | Wolf et al. |
| 2004/0247206 | A1* | 12/2004 | Kaneda et al. ................. 382/305 |
| 2005/0165784 | A1* | 7/2005  | Gomez et al. ..................... 707/9 |
| 2005/0224571 | A1* | 10/2005 | Kelley et al. .................. 235/375 |
| 2006/0136809 | A1* | 6/2006  | Fernstrom ..................... 715/505 |
| 2007/0176000 | A1  | 8/2007  | Cattrone et al. |
| 2007/0177824 | A1  | 8/2007  | Cattrone et al. |
| 2007/0214155 | A1  | 9/2007  | Chang et al. |

FOREIGN PATENT DOCUMENTS

| JP | 2008097066 A    | 4/2008 |
| KR | 1020060063241 A | 6/2006 |
| KR | 1008412740000 B1 | 6/2008 |
| WO | 03073360 A1     | 9/2003 |

OTHER PUBLICATIONS

Notice of the First Office Action for Chinese Patent Application No. 200980138101.2, dated Mar. 27, 2013, 13 pages.
"Microsoft Office Standard 2007, Microsoft Office Professional Plus 2007, and Microsoft Office Enterprise 2007 suites comparison", Feb. 14, 2007, 6 Pages.
"Embedding true type fonts in a Word document", Nov. 14, 2005, 1 page. http://www.idautomation.com/kb/ttf_embedding.html.

(Continued)

*Primary Examiner* — Daniel Hess
*Assistant Examiner* — Tabitha Chedekel
(74) *Attorney, Agent, or Firm* — Dan Choi; Judy Yee; Micky Minhas

(57) ABSTRACT

Method for inserting a barcode image in a document including receiving a request to encode one or more properties about the document as a barcode image in the document, the request being received through a document editor, generating the barcode image based on the properties, wrapping the barcode image inside a container object, and inserting the container object into the document.

15 Claims, 5 Drawing Sheets

(56) References Cited

OTHER PUBLICATIONS

"Insert a barcode into an Office document", 3 pages. http://office.microsoft.com/en-us/powerpoint/HA102103291033.aspx.
"Microsoft Records Management Team Blog", 2006, 5 pages. http://blogs.msdn.com/recman/archive/2006/08/10/694087.aspx.
"International Search Report", Mailed Date: May 11, 2010, Application No. PCT/US2009/058275, Filed Date: Sep. 24, 2009, pp. 11.
Chinese Patent Application No. 200980138101.2 Notice of Second Office Action dated Oct. 9, 2013, 9 pages.
European Patent Application No. 09 816 874.3 Extended Search Report dated Apr. 9, 2013, 9 pages.
European Patent Application No. 09 816 874.3 Supplementary European Search Report dated Sep. 13, 1920, 10 pages.
European Patent Application No. 09 816 874.3, Response to Rules 70(2) and 70a(2) filed on Mar. 25, 2014, 12 pages.
Chinese Patent Application No. 200980138101.2, Notice on the Third Office Action dated Mar. 4, 2014, 15 pages.
Final Office Action Issued in Counterpart Chinese Patent Application No. 200980138101.2, Mailed Date: Jun. 18, 2014, 16 Pages.

\* cited by examiner

ENCODING, UPDATING, AND DECODING BARCODES IN A DOCUMENT

BACKGROUND

Electronic documents contain metadata, or properties, that provide additional information about the file, such as date of last modification, the author, the location of the document on a server, etc. However, after a document is printed, all of the metadata associated with the electronic form of the document is no longer available on the printed document.

SUMMARY

Described herein are implementations of various techniques for using a document editor to encode and decode barcodes on a document. In one implementation, a document editor application may include an option on its graphical user interface (GUI) to create a barcode image on a document. Upon receiving a command to add a barcode image to the document, the document editor application may present the user another GUI that may prompt the user to select one or more properties pertaining to the document that he may wish to encode into the barcode image. After receiving the user's selections, the document editor application may encode information about the selected properties into a barcode image format such as Quick Response (QR) or Data Matrix.

The document editor application may then wrap the barcode image inside a container object or element, which may later be queried by the document editor's object model. The container object may be tagged or marked with a string that may indicate the location of the barcode image in the document. The document editor application may then insert the container object containing the barcode image into the document.

After the barcode image is inserted into the document, the document editor application may generate an Extensible Markup Language (XML) document that may include a list of the properties about the document, a property value for each listed property, and an indication of whether the property was selected to be encoded into the barcode image by the user. The XML document may be inserted into the document's format's property bag and may be accessed by the document editor's object model.

When a document is opened, the document editor application may query the document's property bag for an XML document that may contain information pertaining to the barcode image in the document. If the XML document exists, the document editor may extract information from the XML file and store the information in a memory cache. If the XML document does not exist, the document editor assumes that the document does not contain a barcode image.

Before a document is printed, saved or updated, the document editor application may update the barcode images that may be contained within the document. In order to update the barcode images, the document editor application may first receive the current properties of the document from the document editor's object model. It may then generate a new barcode image containing information about the current properties of the document. The document editor's object model may then be utilized to scan the document for tags or markings that may be in one or more container objects. For each located tag or marking, the document editor application may replace the existing barcode image in the container object with the new barcode image.

In another implementation, the document editor application may also decode a barcode image that may exist on a document. Generally, the document editor application may receive a digital image of the barcode image, and it may return an aggregated string that may be encoded in the barcode image. The document editor application may present the string to the user in a user-friendly format or it may determine if the document's file path is indicated within the aggregated string. If the file path exists within the aggregated string, the document editor application may search the file directories of its computer network for the file path. In one implementation, if the document editor application locates the file path, it may subsequently open the document.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to using a document editor application to encode and decode a barcode. One or more implementations of various techniques for using a document editor application to encode and decode a barcode image will now be described in more detail with reference to FIGS. 1-5 in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
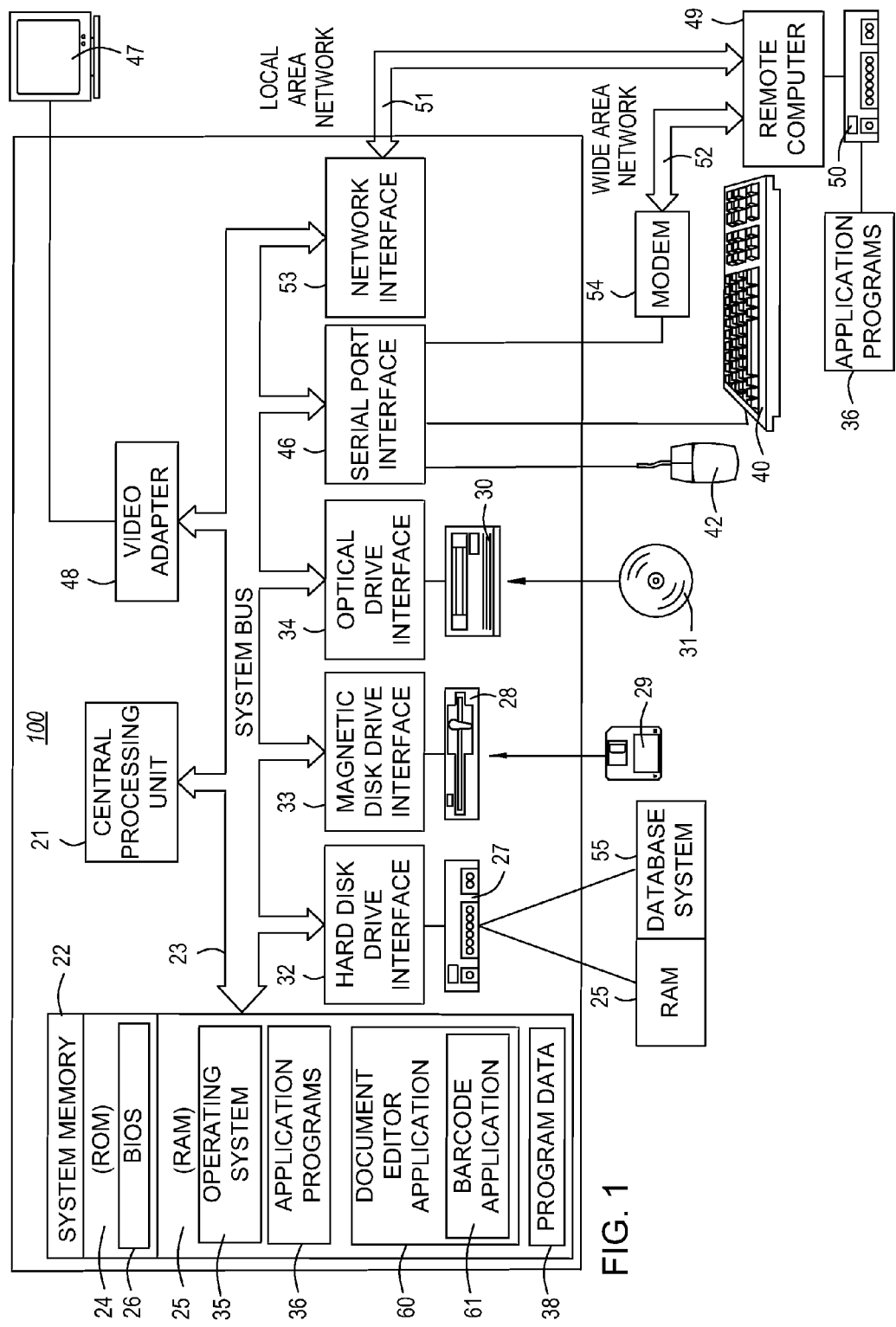
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a document editor application 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The document editor application 60 may be a document processing program that may enable a user to create, save, and print a document. In one implementation, the document editor application 60 may include a barcode application 61 that may be capable of encoding and decoding a barcode image. In one implementation, the barcode application 61 may be separate from the document editor application 60. The document editor application 60 and the barcode application 61 will be described in more detail with reference to FIGS. 2-5 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
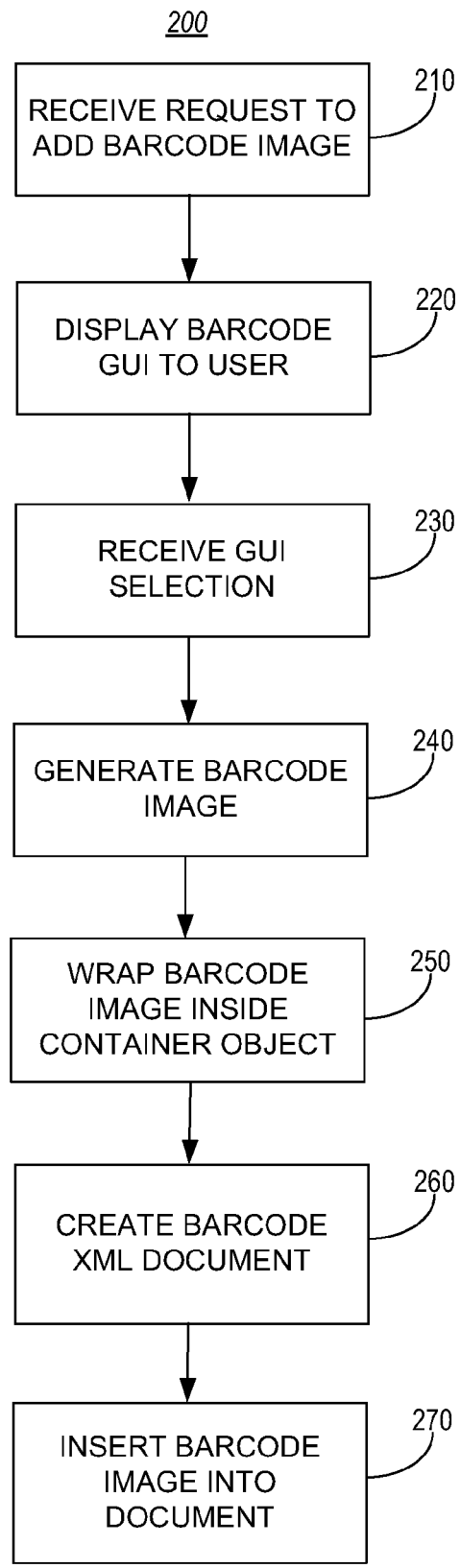
FIG. 2 illustrates a flow diagram of a method for using a document editor to insert a barcode image into a document in accordance with one or more implementations of various techniques described herein.

FIG. 2 illustrates a flow diagram 200 for inserting a barcode image into a document in accordance with one or more implementations of various techniques described herein. The following description of flow diagram 200 is made with reference to computing system 100 of FIG. 1 in accordance with one or more implementations of various techniques described herein. Additionally, it should be understood that while the operational flow diagram 200 indicates a particular order of execution of the operations, in some implementations, certain portions of the operations might be executed in a different order. In one implementation, the process for inserting a barcode image into a document may be performed by the document editor application 60.

At step 210, the document editor application 60 may receive a request from a user to insert a barcode image to a document. In one implementation, the document editor application may provide a graphical user interface (GUI) option to add a barcode image to a document. For example, the GUI may be presented as an icon in a toolbar of the document editor application 60.

At step 220, the document editor application 60 may display a barcode GUI to the user. In one implementation, the barcode GUI may prompt the user to select one or more properties about the document to encode into the barcode image. The properties may include information such as the document's file path location, author, template, previous author, revision number, application name, creation date, last save time, total editing time, number of pages, number of words, number of characters, and the like.

At step 230, the document editor application 60 may receive the selections made by the user on the barcode GUI. In one implementation, upon receiving the user's document property selection, the document editor application 60 may retrieve the corresponding property values of the document using the document editor's object model. For example, if the user selects to add the document's file path location into a barcode image at step 220, the document editor application 60 may retrieve the file path location of the document from the document editor's object model.

At step 240, the document editor application 60 may generate a barcode image that may include information pertaining to the user's selected properties received at step 230. The barcode image may be a one or two dimensional image that may be capable of storing information therein. In order to generate a barcode image, the document editor application 60 may first generate an aggregated string that may include the user's selected properties and its corresponding property values. In one implementation, the aggregated string may include the property name and the corresponding property value of the properties selected by the user. Referring to the previous example, if the user selects to add the document's file path location into a barcode image at step 220, the aggregated string may read "file_path_location=C:/Mydocs/document". In this example, the aggregated string may indicate that the file path for the document in which the barcode image may be generated for is in the "C" drive, in the directory "Mydocs," and is a file that is named "document."

After the aggregated string is generated, the document editor application 60 may send the aggregated string to the barcode application 61 to create a one or two dimensional barcode image with the aggregated string encoded therein. In one implementation, the barcode image may be created in a format such as Quick Response (QR) or Data Matrix.

At step 250, the document editor application 60 may insert the barcode image inside a container object or element. In one implementation, the container object may be tagged or marked with a string that may be used to identify the barcode image among other objects that may be in the document. The tagged or marked container object may facilitate a barcode image update by providing the document editor application 60 a means to locate and replace all of the barcode images contained within the document. In one implementation, the tag or marking in a container object may be located by the document editor's object model.

At step 260, the document editor application 60 may create a barcode Extensible Markup Language (XML) document that may list the properties of the document, the corresponding value for each property, and an indication as to whether the property was selected by the user to be included in the barcode image. In one implementation, the barcode XML document may be inserted into the document's format property bag, and it may be accessible with the document editor's object model. The barcode XML document may facilitate a barcode image update by providing the document editor application 60 with information about which properties may need to be updated and included in the barcode image. The barcode XML document may be of a specific format or schema such that the document editor may recognize the barcode XML document for the purpose of updating a barcode image.

At step 270, the document editor application 60 may insert the container object into the document. In one implementation, the document editor application 60 may prompt the user to select the location on the document the barcode image may be placed.

Figure 3:
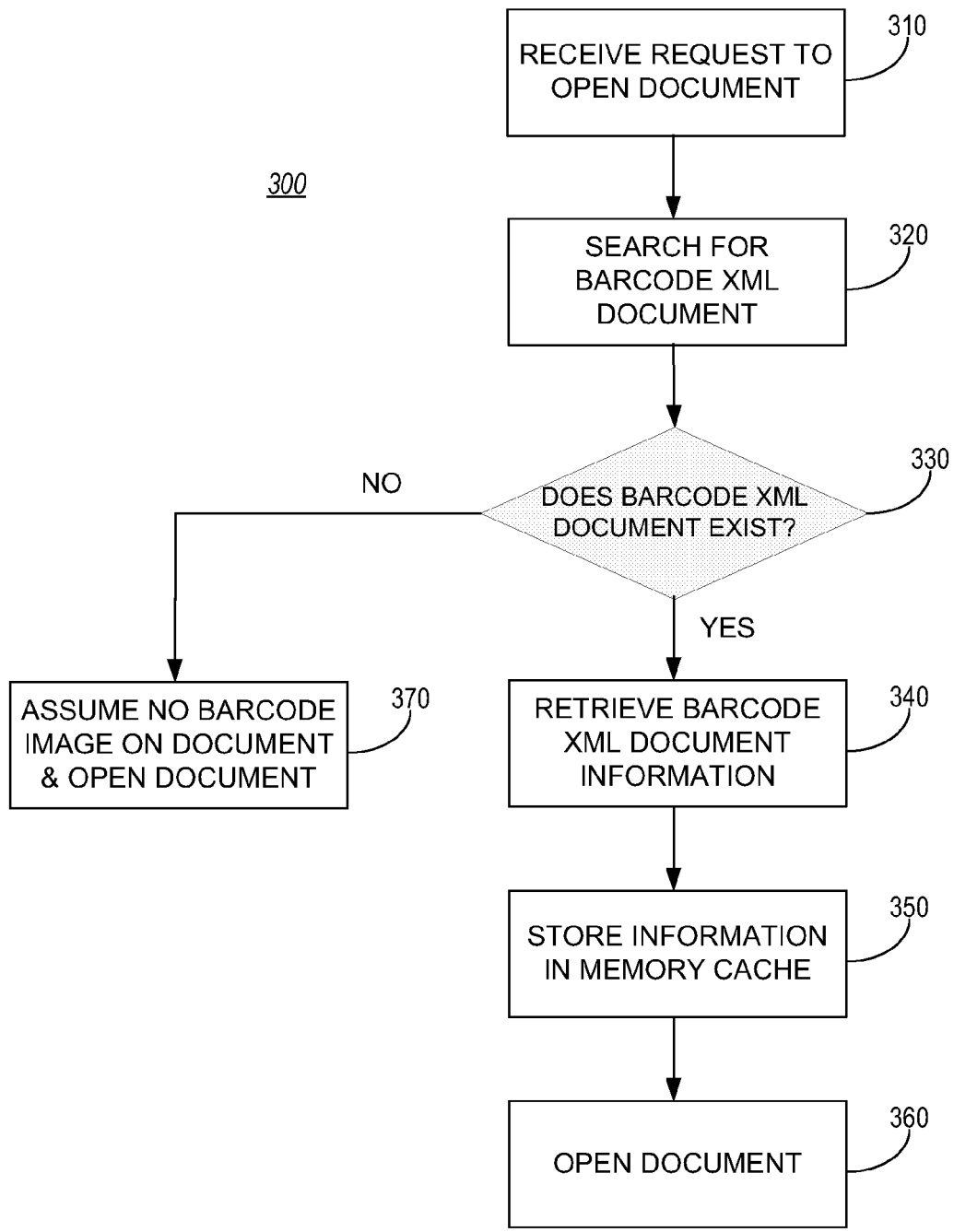
FIG. 3 illustrates a flow diagram of a method for using a document editor to open a document that may include a barcode image in accordance with one or more implementations of various techniques described herein.

FIG. 3 illustrates a flow diagram 300 for opening a document that may include a barcode image in accordance with one or more implementations of various techniques described herein. The following description of flow diagram 300 is made with reference to computing system 100 of FIG. 1 in accordance with one or more implementations of various techniques described herein. Additionally, it should be understood that while the operational flow diagram 300 indicates a particular order of execution of the operations, in some implementations, certain portions of the operations might be executed in a different order. In one implementation, the process for opening a document that may include a barcode image may be performed by the document editor application 60.

At step 310, the document editor application 60 may receive a request to open a document from a user. In one implementation, the document may be opened using a toolbar on the document editor application 60, or it may be opened by locating and accessing the document file using the computing system 100.

At step 320, the document editor application 60 may search the document's property bag for a barcode XML document.

At step 330, the document editor application 60 may determine if the barcode XML document exists. If the barcode XML document exists, the document editor application 60 may proceed to step 340. However, if the barcode XML document does not exist, the document editor application 60 may proceed to step 370.

At step 340, the document editor application 60 may retrieve information that may be stored in the barcode XML document such as the properties of the document, the corresponding property values of the document, and an indication for each property that may have been selected by the user.

At step 350, the document editor application 60 may store the information retrieved at step 340 as a 3-tuple data structure in a memory cache of the computing system 100. In one implementation, the 3-tuple data structure may include the property name, the property value, and a selection state for each property as it may be listed in the barcode XML document.

At step 360, the document editor application 60 may open the document in response to the user's request at step 310.

Referring back to step 330, if the barcode XML document does not exist, the document editor application 60 may proceed to step 370. At step 370, the document editor application 60 may assume that there is no barcode image on the document. In one implementation, the document editor application 60 may then open the document in response to the user's request.

Figure 4:
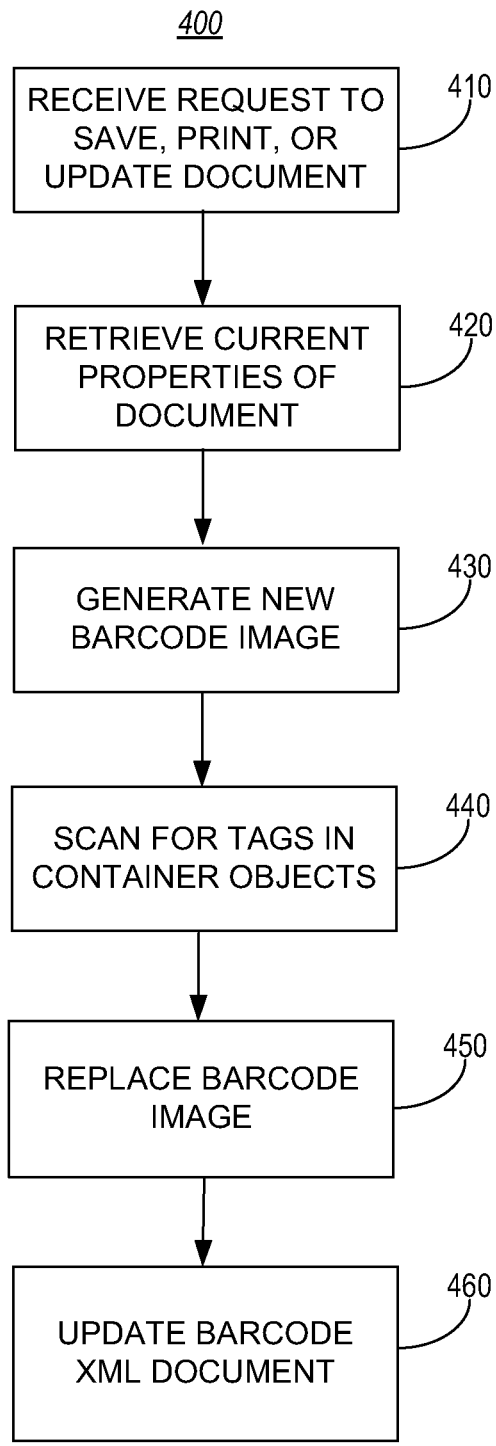
FIG. 4 illustrates a flow diagram of a method for using a document editor to update one or more barcode images in a document in accordance with one or more implementations of various techniques described herein.

FIG. 4 illustrates a flow diagram 400 for updating one or more barcode images in a document in accordance with one or more implementations of various techniques described herein. The following description of flow diagram 400 is made with reference to computing system 100 of FIG. 1 in accordance with one or more implementations of various techniques described herein. Additionally, it should be understood that while the operational flow diagram 400 indicates a particular order of execution of the operations, in some implementations, certain portions of the operations might be executed in a different order. In one implementation, the process for updating one or more barcode images in a document may be performed by the document editor application 60.

At step 410, the document editor application 60 may receive a request to save, print, or update a document.

At step 420, the document editor application 60 may retrieve the current properties of the document. In one implementation, the document editor application 60 may use the document editor's object model to determine the current properties of the document.

At step 430, the document editor application 60 may generate a new barcode image to replace one or more existing barcode images that may exist on the document. In one implementation, the document editor application 60 may first generate a new aggregated string that may include the current information about the document. In order to generate a new aggregated string, the document editor application 60 may first retrieve the information that may be stored in the 3-tuple data structure in the memory cache as described in step 350. Using the information in the 3-tuple data structure, the document editor application 60 may determine which properties were selected by the user to be encoded in the barcode image, and it may retrieve the current values of those properties using the document editor's object model. The document editor application 60 may then create an aggregated string such that it may include the current information pertaining to the user-selected properties of the document. In one implementation, the aggregated string may be generated as "<property name>: <property value><new line character>".

After the aggregated string is generated, the document editor application 60 may pass the aggregated string to the barcode application 61 to create a new one or two dimensional barcode image embedded with the aggregated string.

At step 440, the document editor application 60 may employ the document editor's object model to scan the container objects in the document for tags that may indicate where a barcode image may be located on the document.

At step 450, the document editor application 60 may delete each barcode image that may be in the tagged container objects in the document. The document editor application 60 may then add the new barcode image created at step 430 in the tagged container objects.

At step 460, the document editor application 60 may update the XML document to reflect the current property values of the document.

Figure 5:
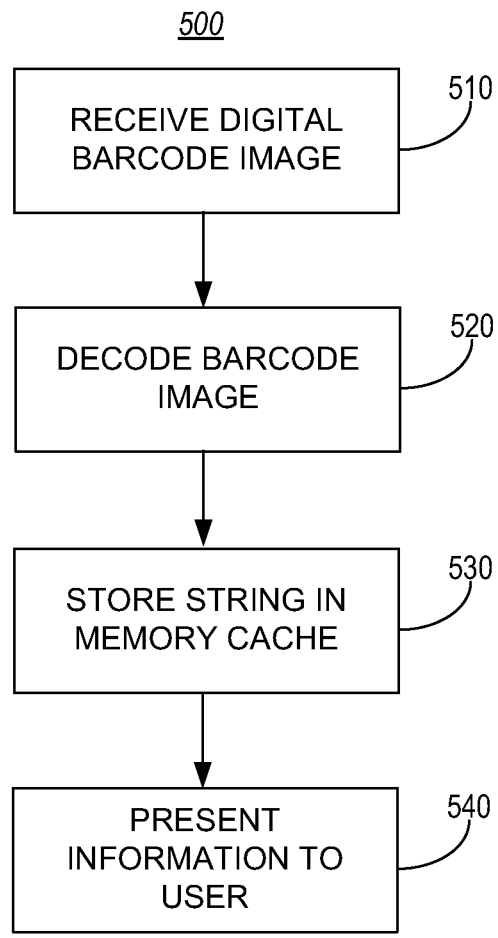
FIG. 5 illustrates a flow diagram of a method for using a document editor to decode one or more barcode images in a document in accordance with one or more implementations of various techniques described herein.

FIG. 5 illustrates a flow diagram 500 for decoding one or more barcode images in a document in accordance with one or more implementations of various techniques described herein. The following description of flow diagram 500 is made with reference to computing system 100 of FIG. 1 in accordance with one or more implementations of various techniques described herein. Additionally, it should be understood that while the operational flow diagram 500 indicates a particular order of execution of the operations, in some implementations, certain portions of the operations might be executed in a different order. In one implementation, the process for decoding one or more barcode images in a document may be performed by the document editor application 60.

At step 510, the document editor application 60 may receive a barcode image in a digital format. In one implementation, the document editor application 60 may open an electronic document that may have one or more barcode images embedded within the document. In this instance, the barcode image may already be stored in a digital format, and the document editor application 60 may begin decoding the barcode image by receiving an input from the pointing device 42, the keyboard 40, or the like.

In another implementation, a user may try to decode a barcode image that may exist on a printed document. In this situation, the document editor application 60 may acquire a digital format of the barcode image of the document with the use of a digital camera, a scanner, or an image file such as a Portable Document Format (PDF) or bitmap file. The digital camera may include web cameras, mobile phone cameras, and any other type of camera that may create a digital image file.

At step 520, the document editor application 60 may pass the barcode image to the barcode application 61 which may decode the barcode image. In one implementation, the barcode application 61 may extract the information stored in a barcode and output the aggregated string that may have originally been used to encode the barcode image. In one implementation, if the barcode image was obtained from an electronic document with the click of the pointing device 42, a click event handler may be triggered by the document editor's object model to pass the barcode image to the barcode application 61.

At step 530, the document editor application 60 may store the aggregated string returned at step 520 in a memory cache. Although the document editor application 60 has been described to store the string in a memory cache, it should be understood that the string may be stored in any memory device such as RAM 25, hard disk 27, memory storage device 50, and the like.

At step 540, the document editor application 60 may present the string encoded in the barcode image to the user. In one implementation, the document editor application 60 may retrieve the string from the memory cache and display it in a format that may be understood by the user. For example, the document editor application 60 may display the barcode information as "<property name>:<property value><new line character>." In another implementation, the document editor application 60 may present the string to the user in its entirety as an aggregated string, or it may display the string in a format that may be easily interpreted by a user. Referring back to the example described in step 240, the document editor application 60 may present the aggregated string for the file path information in the following manner:
"File Path: C:/Mydocs/document"

In another implementation, the barcode image may also include information pertaining to the author of the document. In that case, the aggregated string may be presented as:
"File Path:C:/Mydocs/document Author:User"

In yet another implementation, the document editor application 60 may be able to map the document to a file path location. If the aggregated string includes a file path location, the document editor application 60 may search the computing system 100 for the file path indicated in the aggregated string. If the file path is successfully located on the computing system 100, the document editor application 60 may subsequently open the document. Otherwise, the document editor application 60 may present the aggregated string to the user in an alternate form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for inserting a barcode image in an electronic document having properties, the method comprising:
   receiving a request to encode one or more of the properties pertaining to the electronic document as the barcode image in the electronic document, the request being received through a document editor;
   generating the barcode image based on the one or more properties;
   storing a list of the properties of the electronic document and an indication for each property in the list as to whether the property is encoded as the barcode image;
   wrapping the barcode image inside an electronic container object, using a processor, to facilitate locating the barcode image by querying the electronic container object using the document editor; and
   inserting the electronic container object into the electronic document.

2. The method of claim 1, wherein the properties comprise information that describes the document's file.

3. The method of claim 1, wherein the properties comprise information regarding path location, author, template, previous author, revision number, application name, creation date, last save time, total editing time, number of pages, number of words, number of characters, or combinations thereof.

4. The method of claim 1, wherein receiving the request to encode the properties comprises:
   displaying the properties through a graphical user interface (GUI); and
   receiving a selection of the properties through the GUI.

5. The method of claim 1, wherein generating the barcode image comprises:
   generating an aggregated string having the properties and one or more property values corresponding to the properties;
   encoding the aggregated string into the barcode image: and
   creating the barcode image.

6. The method of claim 1, and further comprising:
   adding a tag to the container object, the tag being indicative of a location of the barcode image within the document, and using the tag to identify the barcode image among a plurality of objects in the document.

7. The method of claim 1, further comprising creating an Extensible Markup Language (XML) document based on the properties.

8. The method of claim 7, wherein the XML document comprises the list of the properties, a list of values for each property, and an indication for each property as to whether the property was selected to be encoded as the barcode image.

9. The method of claim 7, wherein the XML document is part of the document's format property bag and is accessible by the document editor's object model.

10. The method of claim 1, wherein the document editor is a computer software configured to create, save, modify, and print the document.

11. A method for updating a barcode image in a document. the method comprising:
    receiving a request to save, print, or update the document having the barcode image, the document including a set of document properties that comprise a plurality of: a path location, an author, a template, a previous author, a revision number, an application name, a creation date, a last save time, a total editing time, a number of pages, a number of words, and a number of characters;
    identifying an Extensible Markup Language (XML) document that is associated with the document, the XML document identifying, for each document property in the set, a property value for the document property and an indication for the document property as to whether the document property is selected to be encoded as a barcode image for the document;
    generating a new barcode image for the document, wherein generating comprises:
       identifying, based on the indications in the XML document, which document properties are selected to be encoded;
       retrieving current property values for the identified document properties; and
       replacing the barcode image with the new barcode image generated based on the current property values; and
    updating the XML document to reflect the current property values of the document using a processor, including replacing one or more property values listed in the XML document with the current property values.

12. The method of claim 11, wherein the current property values are stored in a 3-tuple data structure.

13. The method of claim 11, wherein replacing the barcode image comprises:
    retrieving one or more properties that have been selected to be included in the barcode image;

generating the new barcode image based on the properties;
scanning the document for one or more container objects configured to store the barcode image; and
replacing the barcode image in each container object with the new barcode image.

14. The method of claim 13, wherein generating the new barcode image comprises:
generating an aggregated string corresponding to the properties that have been selected to be included in the barcode image and the current property values for the properties that have been selected to be included in the barcode image; and
encoding the aggregated string into the new barcode image.

15. The method of claim 14, wherein the aggregated string comprises a format:
"<property name>:<property value><new line character>".

* * * * *